United States Patent
Bastani et al.

(10) Patent No.: US 10,417,739 B2
(45) Date of Patent: Sep. 17, 2019

(54) PHASE ALIGNED FOVEATED RENDERING

(71) Applicant: Google Inc., Mountain View, CA (US)

(72) Inventors: Behnam Bastani, Mountain View, CA (US); Eric Turner, Mountain View, CA (US); Mark Spitzer, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/467,800

(22) Filed: Mar. 23, 2017

(65) Prior Publication Data

US 2018/0275772 A1   Sep. 27, 2018

(51) Int. Cl.
   *G06T 3/00* (2006.01)
   *G06F 3/0346* (2013.01)
   *G06T 19/00* (2011.01)
   *G06F 3/01* (2006.01)
   *G06F 3/038* (2013.01)

(52) U.S. Cl.
   CPC ............ *G06T 3/0093* (2013.01); *G06F 3/011* (2013.01); *G06F 3/013* (2013.01); *G06F 3/038* (2013.01); *G06F 3/0346* (2013.01); *G06T 3/0012* (2013.01); *G06T 19/006* (2013.01)

(58) Field of Classification Search
   None
   See application file for complete search history.

(56) References Cited

U.S. PATENT DOCUMENTS

| | | |
|---|---|---|
| 8,824,779 B1 | 9/2014 | Smyth |
| 9,129,443 B2 | 9/2015 | Gruen et al. |
| 9,165,399 B2 | 10/2015 | Uralsky et al. |
| 9,177,413 B2 | 11/2015 | Tatarinov et al. |
| 9,241,146 B2 | 1/2016 | Neill |
| 9,262,797 B2 | 2/2016 | Minkin et al. |
| 9,311,527 B1 | 4/2016 | Yin et al. |
| 10,007,118 B2 | 6/2018 | Border |
| 10,089,790 B2 | 10/2018 | Lawson et al. |
| 10,109,039 B1 | 10/2018 | Ray et al. |
| 2006/0233459 A1* | 10/2006 | Lange ................... G06T 11/006 382/276 |

(Continued)

OTHER PUBLICATIONS

U.S. Appl. No. 15/813,558, filed Nov. 15, 2017 listing Eric Turner, et al. as inventors entitled "Phase Aligned Foveated Rendering".

(Continued)

*Primary Examiner* — Jwalant Amin (57) ABSTRACT

A display device, such as a head mounted device (HMD), displays a virtual scene. The display device includes a motion tracker for detecting rotation of the display device. The display device also includes a processor that is configured to selectively maintain or modify a position of an array of rendered pixels relative to the virtual scene in response to the detected motion. The processor is also configured to upsample the rendered pixels to generate values of display pixels for presentation by the display device. The processor is further configured to translate the values of the display pixels in a rendering plane of the display device based on the detected motion. The translated values of the display pixels can then be presented on a display of the display device.

21 Claims, 10 Drawing Sheets

(56) References Cited

U.S. PATENT DOCUMENTS

| | | | | |
|---|---|---|---|---|
| 2012/0269430 | A1* | 10/2012 | Deskevich | G06T 5/003 382/167 |
| 2014/0247277 | A1 | 9/2014 | Guenter et al. | |
| 2015/0235583 | A1* | 8/2015 | Schowengerdt | G09G 3/007 345/690 |
| 2016/0364904 | A1 | 12/2016 | Parker et al. | |
| 2017/0018121 | A1 | 1/2017 | Lawson et al. | |

OTHER PUBLICATIONS

Guenter, B., et al., "Foveated 3D Graphics", Microsoft Research, Nov. 2012, 14 pages.
Guenter, B., et al., "Supplement to Goveated 3D Graphics: User Study Details", Microsoft Research, Nov. 2012, 4 pages.
Patney, A., et al., "Perceptually-Based Foveated Virtual Reality", NVIDIA, 2016, 2 pages.
International Search Report and Written Opinion dated Feb. 26, 2018 for PCT Application No. PCT/US2017/058709, 14 pages.
Anjul Patney, et al., "Towards Foveated Rendering for Gaze-Tracked Virtual Reality," ACM Transactions on Graphics (TOG), ACM, US, vol. 35, No. 6, Nov. 11, 2016, 12 pages.
International Search Report and Written Opinion dated Nov. 9, 2018 for PCT Application No. PCT/US2018/046611, 14 pages.
Non-Final Office Action dated Jan. 17, 2019 for U.S. Appl. No. 15/813,558, 10 pages.
International Preliminary Report on Patentability dated Feb. 13, 2019 for PCT Application No. PCT/US2017/058709, 6 pages.

\* cited by examiner

PHASE ALIGNED FOVEATED RENDERING

BACKGROUND

Foveated rendering exploits the falloff in acuity of the human eye at the visual periphery to conserve power and computing resources used to generate digital images for display to users, e.g., to display augmented reality (AR) or virtual reality (VR) using a head mounted device (HMD). In foveated rendering, a user's central gaze direction is determined, either as the center of a current field-of-view or using eye tracking to determine where the user is looking. The user's field-of-view is then subdivided into a high-acuity region that surrounds the central gaze direction and one or more lower-acuity regions in the visual periphery. The high-acuity region includes a portion of the field-of-view that is within a first angular distance of the central gaze direction. The angular distance from the central gaze direction is referred to as the eccentricity. The lower-acuity regions include portions of the field-of-view that are at larger eccentricities. For example, the high-acuity region can include a portion of the field-of-view that is within an eccentricity of 5-10°, which corresponds to a portion of the field-of-view that projects to a retinal region in the human eye called the fovea. Pixels are rendered at high resolution within the high-acuity region, e.g., by rendering the pixels at a resolution corresponding to the native resolution supported by the display. Pixels in the low-acuity regions at eccentricities larger than 5-10° are rendered at lower resolutions, thereby reducing the power and computing resources needed to render the pixels. The rendered pixels in the low-acuity regions can subsequently be upsampled to generate display pixels at the native resolution of the display, e.g., using well-known interpolation techniques such as bilinear interpolation.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Rendering pixels at low resolution in low-acuity regions of a user's field-of-view and subsequently upsampling the rendered pixels to generate higher resolution display pixels can generate visual artifacts such as aliasing artifacts. A change in the user's field-of-view, e.g., due to movement of the user's head while wearing an HMD, changes the mapping of the rendered pixels to the virtual scene that the user is observing because the pattern of the rendered pixels is fixed to the display. Thus, the value of each rendered pixel changes as it sweeps across the virtual scene. The time-dependent value of the rendered pixels introduces a time dependence in values of the upsampled display pixels, which can generate a corresponding time dependence in the aliasing artifacts. Static aliasing artifacts in the low-acuity regions are not noticeable because of the falloff in acuity with eccentricity. However, the human eye remains very sensitive to motion in the visual periphery. Consequently, time-dependent aliasing artifacts in the low-acuity regions are very noticeable and can disrupt the user's sense of immersion in the virtual scene.

The time dependence of aliasing artifacts produced by motion of a display device (such as an HMD) can be reduced by maintaining a position of an array of rendered pixels relative to a virtual scene during motion of the display device, upsampling the rendered pixels to generate values of corresponding display pixels, and then translating coordinates of the display pixels based on the motion of the display device. Initially, the array of rendered pixels are positioned at a fixed, default orientation relative to the virtual scene and the display device. The relative position of the array and the virtual scene can then be selectively maintained or modified in response to motion of the display device by either maintaining or modifying the position of the array relative to the display device. For example, a relative rotation of the array and the virtual scene are maintained by shifting the array relative to the display device to compensate for motion of the display device as long as the display device has moved an angular distance that is less than an angular resolution of a single pixel. If the angular motion of the display device relative to the virtual scene is greater than one pixel's angular resolution, then the array's shifted position for each frame relative to the display device only uses the fractional residual angular resolution, ignoring rotations that are integer multiples of rendered pixel angular resolution. This process is referred to as "snapping" the array to the nearest rendered pixel. The translation applied to the display pixels is set to zero in response to snapping the array to the nearest rendered pixel. After snapping the array, the translation is determined based on the magnitude and direction of motion of the display device relative to the new position of the array relative to the virtual scene. The translation is applied to the display pixels along a two-dimensional (2-D) rendering plane. In some embodiments, the array of rendered pixels includes a set of buffered pixels that have values determined by portions of the virtual scene that border, but are outside of, a current field-of-view of the display device. The values of the buffered pixels can be upsampled to generate values of display pixels that are translated into the current field-of-view of display device based on the motion of the display system. In this case, the size of the border is one rendered pixel on each side to ensure total coverage of the display by rendered content.

Figure 1:
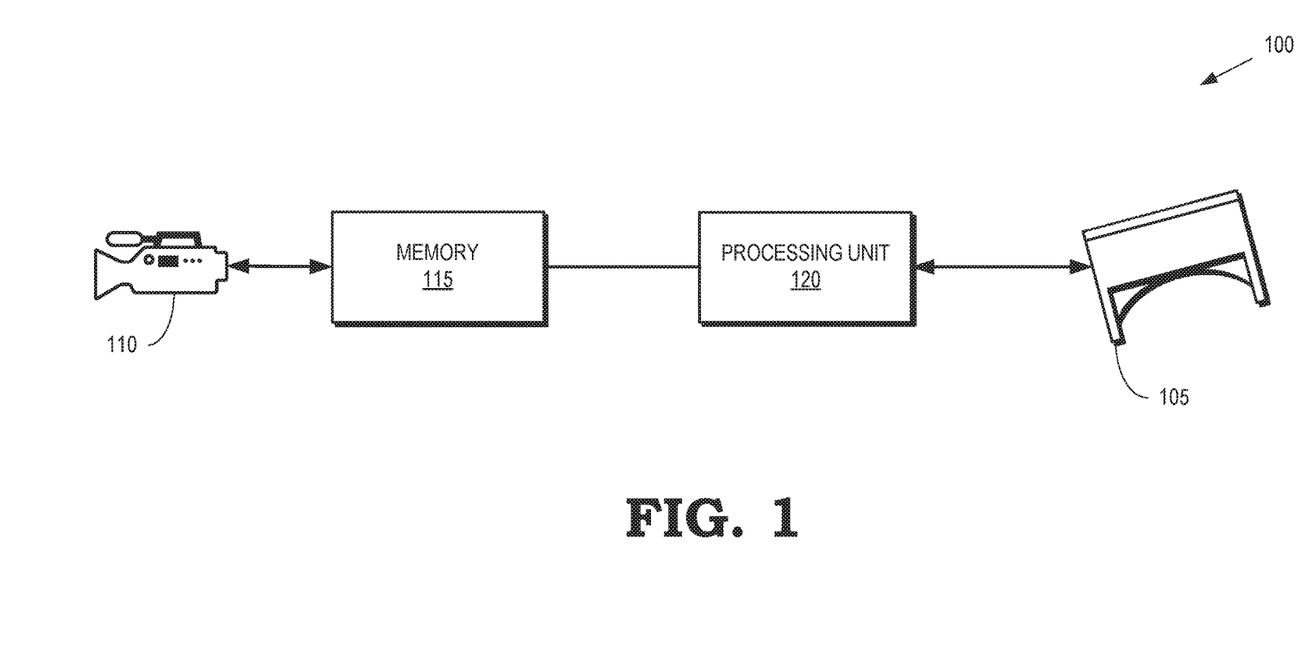
FIG. 1 is a diagram of an image acquisition and display system that supports immersive virtual reality (VR) or augmented reality (AR) functionality according to some embodiments.

FIG. 1 is a diagram of an image acquisition and display system 100 that supports immersive virtual reality (VR) or augmented reality (AR) functionality according to some embodiments. Immersive VR and AR systems typically utilize an electronic device 105 that presents stereoscopic imagery to a user so as to give a sense of presence in a three-dimensional (3D) scene. For example, the electronic device 105 is designed to produce a stereoscopic image over a field-of-view that approaches or is equal to the field-of-view of a human eye, which is approximately 180°. The illustrated embodiment of the electronic device 105 can include a portable user device, such as head mounted display (HMD), a tablet computer, computing-enabled cellular phone (e.g., a "smartphone"), a notebook computer, a personal digital assistant (PDA), a gaming console system, and the like. In other embodiments, the electronic device 105 can include a fixture device, such as medical imaging equipment, a security imaging sensor system, an industrial robot control system, a drone control system, and the like. For ease of illustration, the electronic device 105 is generally described herein in the example context of an HMD system; however, the electronic device 105 is not limited to these example implementations.

The image acquisition and display system 100 includes an image acquisition device 110 that is used to acquire two-dimensional (2-D) images of a scene for presentation to a user via the electronic device 105. The image acquisition device 110 can include either or both of a physical image acquisition device, such as a camera, that acquires images of an actual scene, or a virtual image acquisition device 110 that generates images of a virtual scene such as a scene represented by a three-dimensional (3-D) model. For example, if the electronic device 105 is supporting a VR application, the image acquisition device 110 can be a virtual image acquisition device 110 that generates images of the virtual scene for presentation to the user. For another example, if the electronic device 105 is supporting an AR application, the image acquisition device 110 can include both a physical image acquisition device to acquire an image of an actual scene as viewed from the perspective of the user and a virtual image acquisition device to generate a virtual image of a virtual scene. The image acquisition device 110 can then combine the virtual image and the actual image to create a composite AR image for presentation to the user.

The image acquisition and display system 100 includes one or more memories 115 that are used to store digital information representative of images acquired by the image acquisition device 110. The memory 115 can be implemented as dynamic random access memory (DRAM), non-volatile random access memory (NVRAM), flash memory, and the like. Some embodiments of the memory 115 also implement one or more caches for storing recently accessed information. The image acquisition and display system 100 also includes one or more processing units 120 that are configured to access information from the memory 115 and execute instructions such as instructions stored in the memory 115. The one or more processing units 120 can also store the results of the executed instructions in the memory 115. The one or more processing units 120 can include a central processing unit (CPU), a graphics processing unit (GPU), and the like. As discussed herein, the electronic device 105 can also include one or more processing units and memories. The operations described herein can therefore be executed by the electronic device 105, by the processing units 120, or the workload can be shared between the electronic device 105 and the processing units 120.

Figure 2:
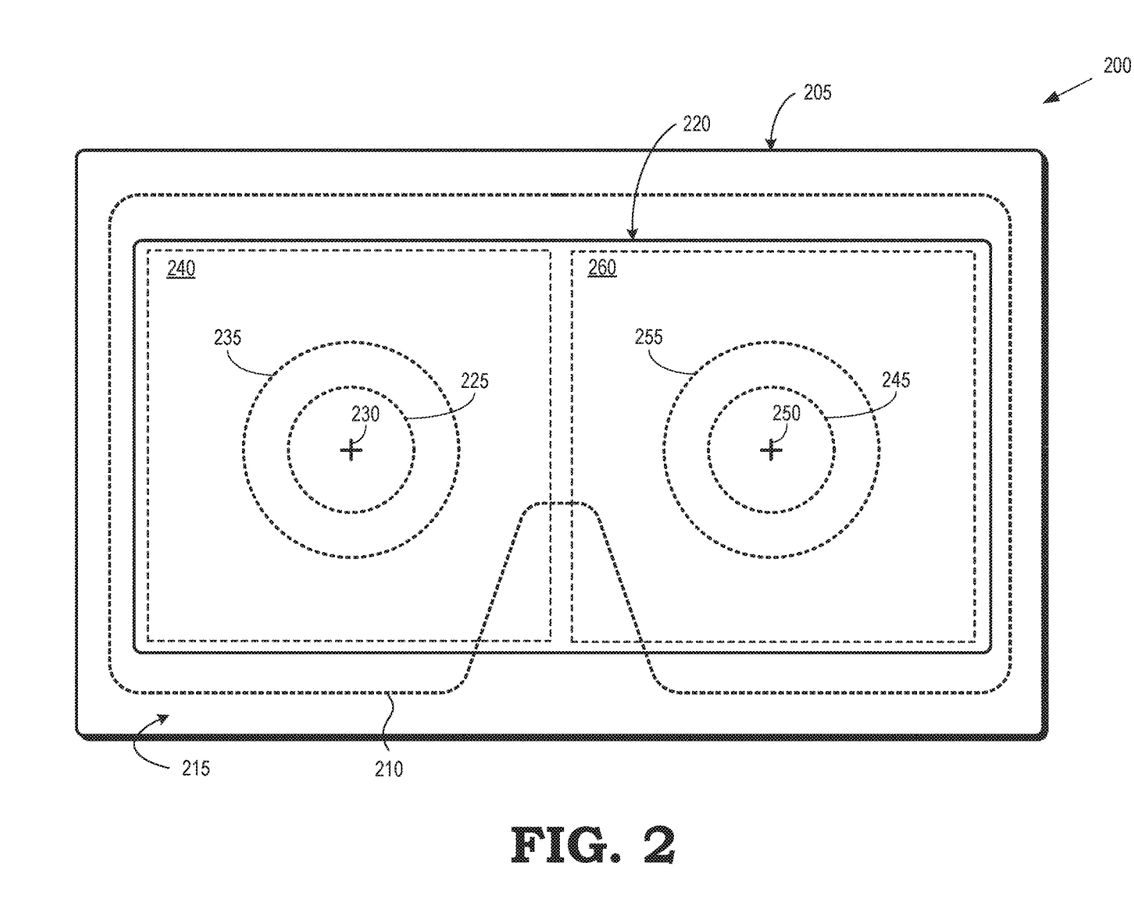
FIG. 2 illustrates a display system that includes an electronic device configured to provide immersive VR or AR functionality according to some embodiments.

FIG. 2 illustrates a display system 200 that includes an electronic device 205 configured to provide immersive VR or AR functionality according to some embodiments. The electronic device 205 is used to implement some embodiments of the electronic device 105 shown in FIG. 1. A back plan view of an example implementation of the electronic device 205 in an HMD form factor in accordance with at least one embodiment of the present disclosure is shown in FIG. 2. The electronic device 205 can be implemented in other form factors, such as a smart phone form factor, tablet form factor, a medical imaging device form factor, a stand-alone computer, a system-on-a-chip (SOC), and the like, which implement configurations analogous to those illustrated. As illustrated by the back plan view, the electronic device 105 can include a face gasket 210 mounted on a surface 215 for securing the electronic device 205 to the face of the user (along with the use of straps or a harness).

The electronic device 205 includes a display 220 that is used to generate images such as VR images or AR images that are provided to the user. The display 220 is divided into two substantially identical portions, a right portion to provide images to the right eye of the user and a left portion to provide images to the left eye of the user. In other embodiments, the display 220 is implemented as two different displays, one dedicated to each eye. The electronic device 205 implements foveated rendering to present images to the user. The display 220 is therefore subdivided into different regions based on a distance from the user's center of gaze, e.g., the eccentricity. For example, the field-of-view for the user's left eye can be subdivided into a high-acuity region 225 that surrounds a central gaze direction 230. The field-of-view for the user's left eye is further subdivided into lower-acuity regions 235, 240 in the visual periphery. Similarly, the field-of-view for the user's right eye can be subdivided into a high acuity region 245 that surrounds a central gaze direction 250 and lower acuity regions 255, 260 in the visual periphery. The central gaze directions 230, 250 can be set equal to the center of a current field-of-view or they can be determined on the basis of eye tracking measurements that detect the central gaze direction of the user's eyes. In some embodiments, more or fewer lower acuity regions can be defined for the display 220.

Pixels are rendered at high resolution within the high-acuity regions 225, 245, e.g., by rendering the pixels at a resolution that is equal to the native resolution supported by the display. Pixels in the low-acuity regions 235, 240, 255, 260 are rendered at lower resolutions, thereby reducing the power and computing resources needed to render the pixels. The rendered pixels in the low-acuity regions 235, 240, 255, 260 are subsequently upsampled to generate display pixels at the native resolution of the display, e.g., using well-known interpolation techniques such as bilinear interpolation.

Figure 3:
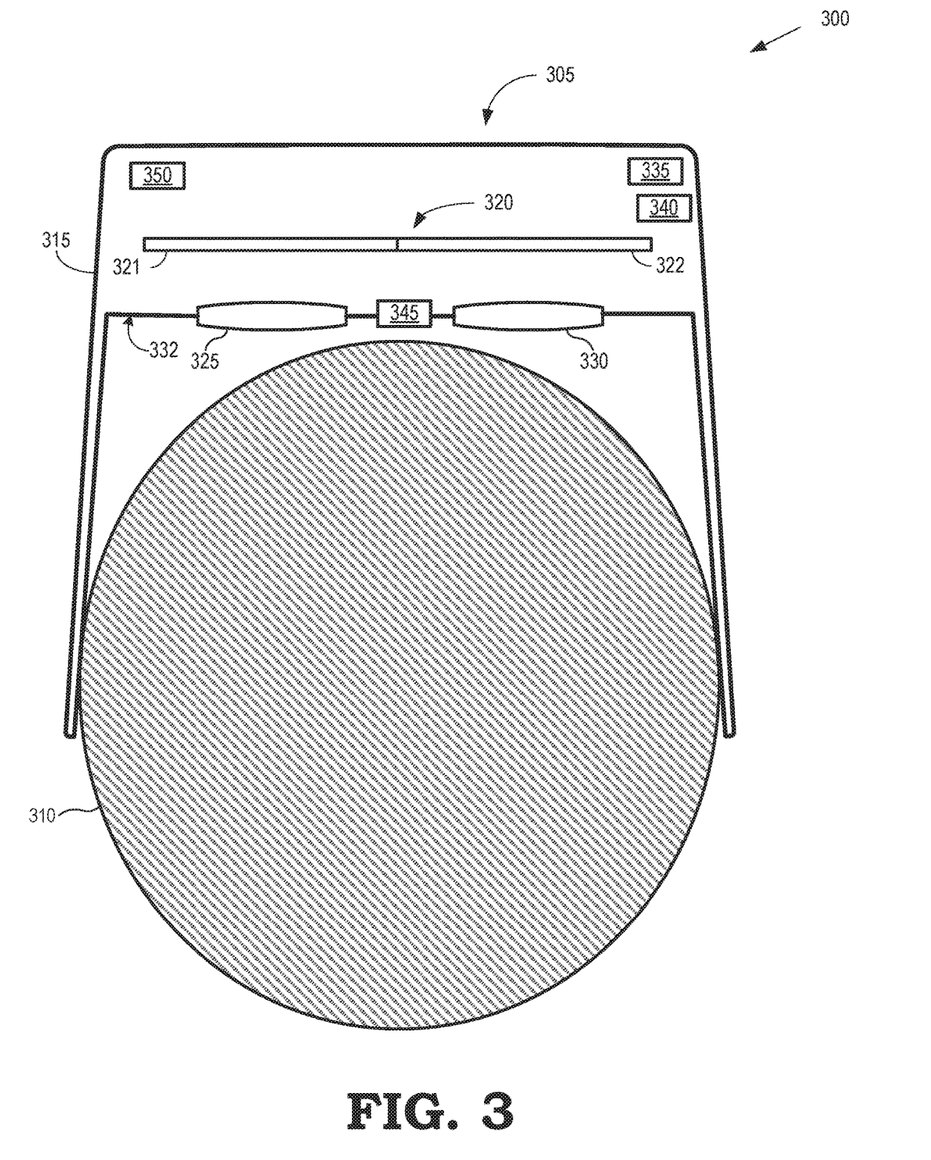
FIG. 3 illustrates a display system that includes an electronic device configured to provide AR or VR functionality to a user wearing the electronic device via a display according to some embodiments.

FIG. 3 illustrates a display system 300 that includes an electronic device 305 configured to provide AR or VR functionality to a user wearing the electronic device 305 via a display according to some embodiments. The electronic device 305 is used to implement some embodiments of the electronic device 105 shown in FIG. 1 and the electronic device 205 shown in FIG. 2. The electronic device 305 is shown in FIG. 3 as being mounted on a head 310 of a user. As illustrated, the electronic device 305 includes a housing 315 that includes a display 320 that generates an image for presentation to the user. The display 320 is implemented using some embodiments of the display 220 shown in FIG. 2. In the illustrated embodiment, the display 320 is formed of a left display 321 and a right display 322 that are used to display stereoscopic images to corresponding left eye and right eye. However, in other embodiments, the display 320 is a single monolithic display 320 that generates separate stereoscopic images for display to the left and right eyes. The electronic device 305 also includes eyepiece lenses 325 and 330 disposed in corresponding apertures or other openings in a user-facing surface 332 of the housing 315. The display 320 is disposed distal to the eyepiece lenses 325 and 330 within the housing 315. The eyepiece lens 325 is aligned with the left eye display 321 and the eyepiece lens 330 is aligned with the right eye display 322.

In a stereoscopic display mode, imagery is displayed by the left eye display 321 and viewed by the user's left eye via the eyepiece lens 325. Imagery is concurrently displayed by the right eye display 322 and viewed by the user's right eye via the eyepiece lens 325. The imagery viewed by the left and right eyes is configured to create a stereoscopic view for the user. Some embodiments of the displays 320, 321, 322 are fabricated to include a bezel (not shown in FIG. 3) that encompasses outer edges of the displays 320, 321, 322. In that case, the lenses 325, 330 or other optical devices are used to combine the images produced by the displays 320, 321, 322 so that bezels around the displays 320, 321, 322 are not seen by the user. Instead, lenses 325, 330 merge the images to appear continuous across boundaries between the displays 320, 321, 322.

In some embodiments, some or all of the electronic components that control and support the operation of the display 320 and other components of the electronic device 305 are implemented within the housing 315. For example, the electronic device 305 can include a processing unit such as a GPU 335 and a memory 340. In some embodiments the workload associated with acquiring actual or virtual images and rendering these images for display on the display 320 can be shared with external processing units such as the processing unit 120 shown in FIG. 1. Some embodiments of the electronic device 305 include an eye tracker 345 to track movement of the user's eyes and determine a center of gaze for each eye in real-time. The electronic device 305 also includes one or more motion sensors 350. Examples of motion sensors 350 include accelerometers, gyroscopic orientation detectors, or other devices capable of detecting motion of the electronic device 305.

In the illustrated embodiment, the GPU 335 is configured to render pixels at different resolutions depending on an eccentricity from a center of gaze for the user. For example, the displays 321, 322 can be subdivided into high acuity regions and low acuity regions. The GPU 335 renders pixels in the high acuity regions at a higher resolution (e.g., at the native resolution of the display 321, 322) and renders pixels in the low acuity regions at lower resolutions. The GPU 335 then upsamples the rendered pixels to generate values of display pixels at the native resolution for presentation to the user by the displays 321, 322. As discussed herein, a change in the user's field-of-view, e.g., due to movement of the user's head 310 while wearing the electronic device 305, changes the mapping of rendered pixels to the scene that the user is observing if the pattern of the rendered pixels is fixed relative to the display 320 in the electronic device 305. Thus, the value of each rendered pixel changes as it sweeps across the virtual scene, which can generate a corresponding time dependence in the aliasing artifacts. Time-dependent aliasing artifacts in the low-acuity regions are very noticeable and can disrupt the user's sense of immersion in the virtual scene.

The noticeability of time-dependent aliasing artifacts in the low acuity regions is reduced by selectively maintaining or modifying a position of an array of rendered pixels relative to a virtual scene in response to detecting motion of the electronic device 305. The array of rendered pixels is used to define lower resolution pixels in one or more of the low acuity regions. The GPU 335 maintains the position of the array of rendered pixels relative to the virtual scene as long as the electronic device 305 has moved an angular distance that is less than an angular resolution of a rendered pixel. Maintaining the relative orientation of the array of rendered pixels and the virtual scene reduces time variability of the values of the rendered pixels, which can reduce the number or visibility of time-dependent aliasing artifacts in the low acuity regions. However, maintaining the relative orientation of the array and the virtual scene changes the relative orientation of the array and the display 320. Thus, after rendering the lower resolution pixels in the low acuity regions and upsampling the rendered pixels to generate values of the display pixels, the GPU 335 translates the values of the display pixels in a rendering plane of the display 320 based on the detected motion to maintain the correct relative orientation of the display pixels and the display 320.

The GPU 335 modifies the position of the array of rendered pixels relative to the virtual scene in response to the electronic device 305 moving an angular distance that is greater than or equal to the angular resolution of a rendered pixel. For example, the GPU 335 can set the position of the array of rendered pixels to correspond to a first orientation relative to the virtual scene and a second orientation relative to the display 320. Prior to any subsequent motion of the electronic device 305, the first and second orientations are aligned with each other. If the orientation of the array of rendered pixels is modified to maintain the first (fixed) orientation of the array relative to the virtual scene as the electronic device 305 moves through an angular distance, the first orientation becomes displaced from the second orientation by the angular distance. The GPU 335 can shift the position of the array of rendered pixels by integer increments of the pixel angular resolution, realigning the array with the second orientation once the angular distance becomes greater than or equal to the angular resolution, thereby establishing a new value of the first orientation that is again fixed relative to the virtual scene for subsequent motion. This process is referred to as "snapping" the position of the array of rendered pixels to the nearest rendered pixel.

Figure 4:
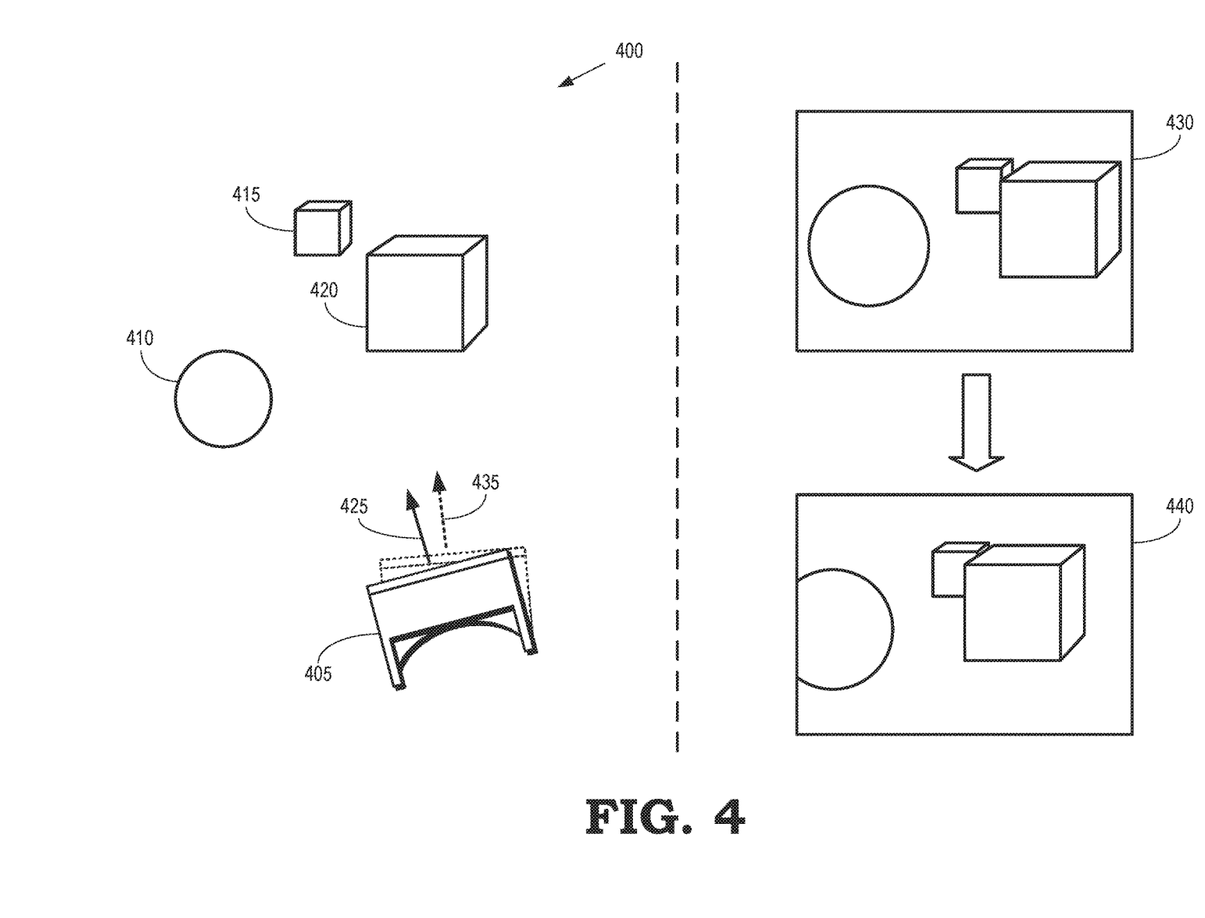
FIG. 4 is a block diagram illustrating a virtual scene that is displayed to a user via a head mounted device (HMD) according to some embodiments.

FIG. 4 is a block diagram illustrating a virtual scene 400 that is displayed to a user via a head mounted device (HMD) 405 according to some embodiments. The virtual scene 400 corresponds to virtual scenes displayed by the electronic device 105 shown in FIG. 1, the electronic device 205 shown in FIG. 2, and the electronic device 305 shown in FIG. 3. In the illustrated embodiment, the virtual scene 400 includes a ball 410, a small box 415, and a large box 420. Initially, the HMD 405 is in a first orientation relative to the virtual scene 400, as indicated by the arrow 425. The HMD 405 in the first orientation renders an image 430 of the virtual scene 400 for presentation to the user. The HMD 405 subsequently moves, e.g., due to motion of the head of the user wearing the HMD, to a second orientation relative to the virtual scene 400, as indicated by the arrow 435. The HMD 405 in the second orientation renders an image 440 of the virtual scene 400 for presentation to the user. The positions of the ball 410, the small box 415, and the large box 420 are shifted toward the left in the image 440, relative to their positions in the image 430.

Figure 5:
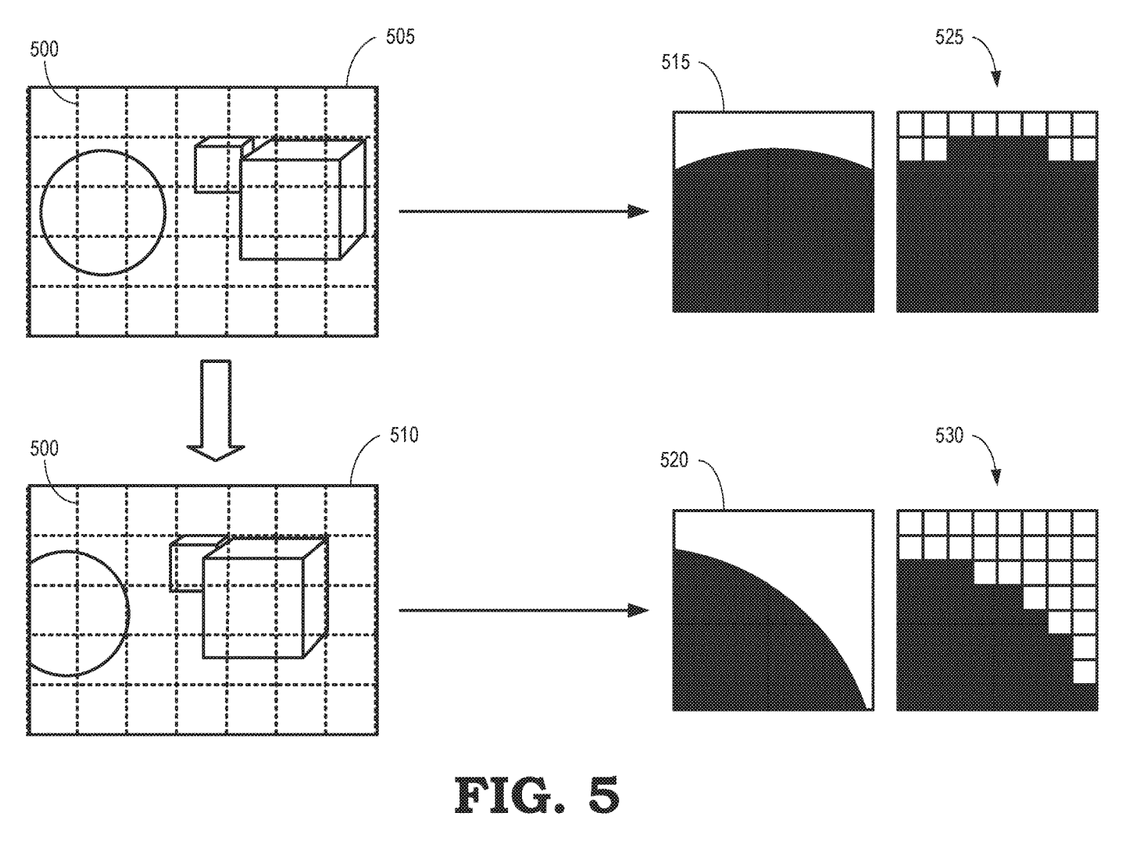
FIG. 5 illustrates rendered pixels and display pixels that are generated by an HMD that maintains a fixed orientation of an array of rendered pixels relative to a display of the HMD.

FIG. 5 illustrates rendered pixels and display pixels that are generated by an HMD that maintains a fixed orientation of an array 500 of rendered pixels relative to a display of the HMD. The array 500 is indicated by the dashed lines. The array 500 defines the rendered pixels for a first image 505 of a virtual scene (which corresponds to the image 430 shown in FIG. 4) and the rendered pixels for a second image 510 of the virtual scene (which corresponds to the image 440 shown in FIG. 4). Since the orientation of the array 500 is fixed relative to the display, values of the rendered pixels defined by the array change in response to motion of the HMD. For example, a value of the rendered pixel 515 (which corresponds to the rendered pixel that is second from the top and second from the left in the array 500) differs from a value of the rendered pixel 520, which corresponds to the rendered pixel at the same location in the array 500 as the rendered pixel 515.

Upsampling of the values of the rendered pixels 515, 520 creates different patterns of aliasing artifacts. For example, upsampling the value of the rendered pixel 515 to generate values of a set 525 of display pixels generates a first pattern of values that includes aliasing artifacts caused by attempting to depict a smooth curve using discrete values of display pixels. Upsampling the value of the rendered pixel 520 to generate values of a set 530 of display pixels generates a second pattern of values that includes different aliasing artifacts. Thus, fixing the orientation of the array 500 relative to the display introduces time-dependent aliasing artifacts in the values of the upsampled display pixels in the sets 525, 530.

Figure 6:
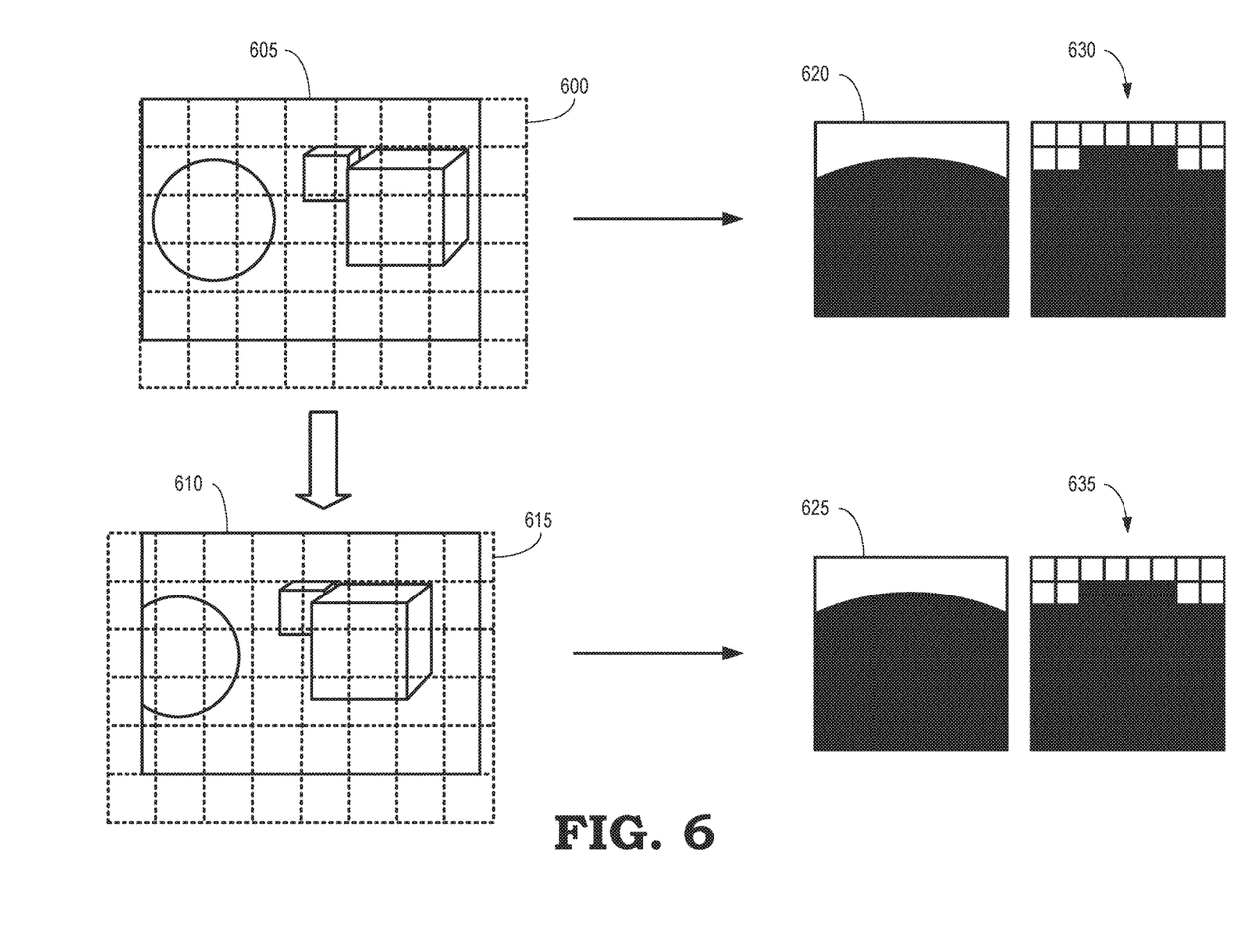
FIG. 6 illustrates rendered pixels and display pixels that are generated by an HMD that maintains a fixed orientation of an array of rendered pixels relative to a virtual scene according to some embodiments.

FIG. 6 illustrates rendered pixels and display pixels that are generated by an HMD that maintains a fixed orientation of an array 600 of rendered pixels relative to a virtual scene according to some embodiments. The array 600 is indicated by the dashed lines. The array 600 defines the rendered pixels for a first image 605 of a virtual scene, which corresponds to the image 430 shown in FIG. 4. In the illustrated embodiment, the array 600 also includes additional pixels that border, but are outside of, the first image 605. In the interest of clarity, only the additional pixels that border, but are outside of, the right-hand vertical border and the lower border of the first image 605 are shown in FIG. 6. However, in some embodiments, the array 600 includes additional pixels that border, but are outside of, all the boundaries of the first image 605.

The second image 610 represents the virtual scene subsequent to motion of the HMD. For example, the second image 610 correspond to the image 440 shown in FIG. 4. The array 615 maintains a fixed orientation relative to the virtual scene and, consequently, the orientation of the array 615 shifts relative to the orientation of the array 600, the display, and the boundaries of the second image 610. Since the orientation of the array 615 is fixed relative to the virtual scene, changes in the values of the rendered pixels in the array 610 are reduced or eliminated relative to the values of the corresponding rendered pixels in the array 600. For example, a value of the rendered pixel 620 (which corresponds to the rendered pixel that is second from the top and second from the left in the array 600) is substantially the same as a value of the rendered pixel 625, which corresponds to the rendered pixel at the same location in the array 615 as the rendered pixel 620 in the array 600.

The rendered pixels 620, 625 can then be upsampled to generate corresponding sets 630, 635 of display pixels. Fixing the orientation of the arrays 600, 615 relative to the virtual scene causes the values of the rendered pixels 620, 625 to remain substantially the same. Consequently, upsampling the rendered pixels 620, 625 to generate values of the sets 630, 635 of display pixels creates substantially the same pattern of aliasing artifacts, which reduces or eliminates the time dependence of aliasing artifacts associated with rendered pixels in the arrays 600, 615. The sets 630, 635 of display pixels can then be translated (or otherwise transformed) from a coordinate system that is fixed relative to the virtual scene to a coordinate system that is fixed relative to the display. The amount of translation is determined by an offset (e.g., an angular distance) between the shifted array 615 and the initial position of the array 600 that is produced by motion of the HMD.

Figure 7:
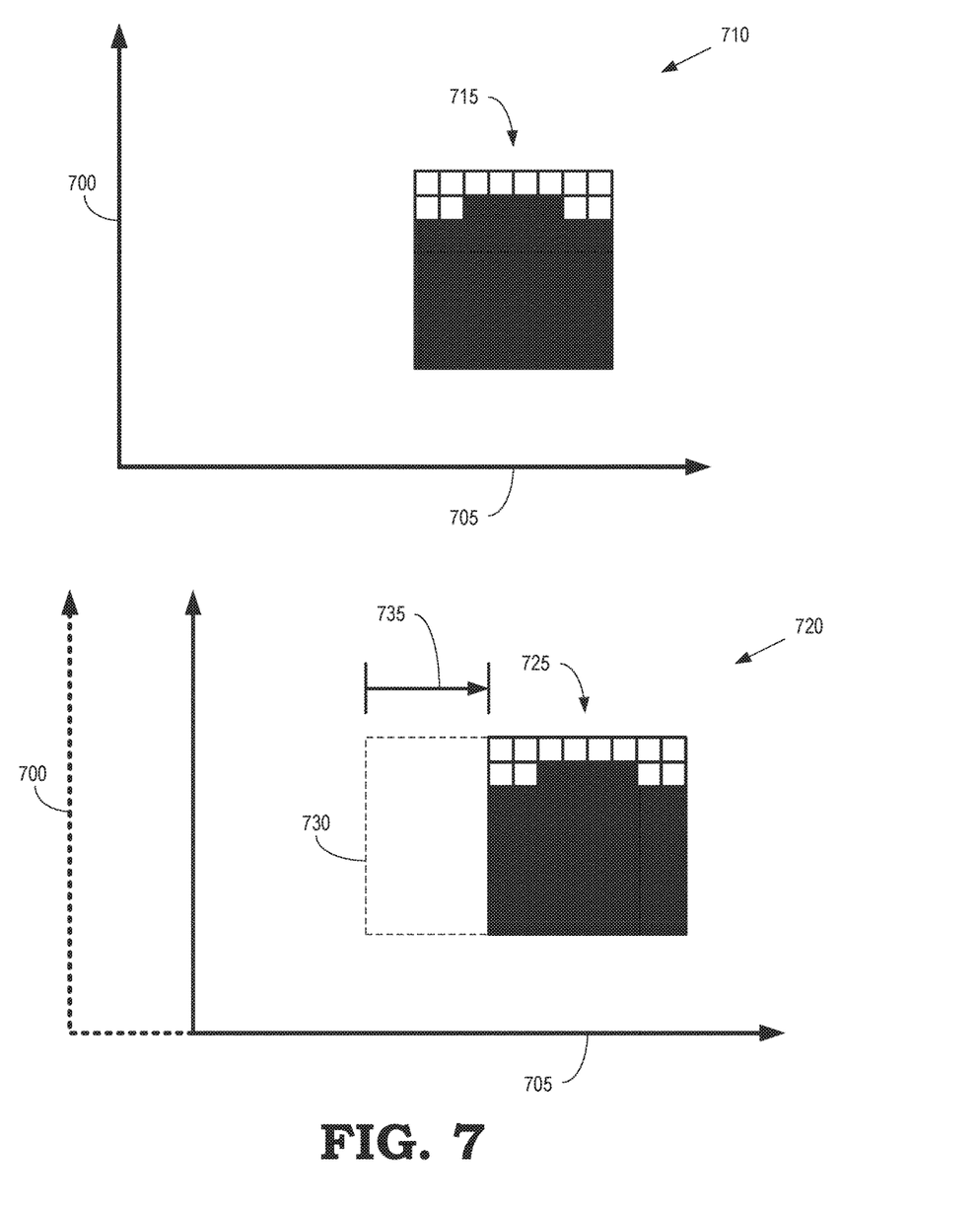
FIG. 7 illustrates translation of display pixels from a coordinate system that is fixed relative to the virtual scene to a coordinate system that is fixed relative to a display of an HMD according to some embodiments.

FIG. 7 illustrates translation of display pixels from a coordinate system 700 that is fixed relative to the virtual scene to a coordinate system 705 that is fixed relative to a display of an HMD according to some embodiments. The vertical axes of the coordinate systems 700, 705 represent inclination and the horizontal axes of the coordinate systems 700, 705 represent azimuth. However, other embodiments of the coordinate systems 700, 705 may use different definitions of the horizontal and vertical axes.

A first image 710 is rendered at a first time prior to motion of the HMD relative to an initial or default orientation that determines a first orientation of an array of rendered pixels relative to the virtual scene and a second orientation of the array of rendered pixels relative to the display of the HMD. Since the HMD has not yet moved relative to the initial or default orientation, the first and second orientations are the same. Consequently, the coordinate systems 700, 705 overlap in the first image 710. A first set 715 of display pixels are generated by upsampling a corresponding rendered pixel that represents a portion of the first image 710. Since the coordinate systems 700, 705 overlap (and the first and second orientations are the same), there is no need to translate or transform the display pixels from the coordinate system 700 to the coordinate system 705.

A second image 720 is rendered at a second time subsequent to motion of the HMD by an angular distance relative to the initial or default orientation. The coordinate system 700 that is fixed relative to the virtual scene is therefore shifted by an amount determined by the angular distance relative to the coordinate system 705, which is fixed relative to the display in the HMD. A second set 725 of display pixels are generated by upsampling a corresponding rendered pixel that represents a portion of the second image 720. The pixel is rendered in the coordinate system 700 and so the second set 725 of display pixels must be translated or transformed from the coordinate system 700 to the coordinate system 705 that is fixed relative to the display of the HMD. For example, the position of the second set 725 of display pixels in the coordinate system 700 is indicated by the dashed box 730. The second set 725 is translated by an offset 735 that is equal to the angular distance moved by the HMD. The translated second set 725 is then at the correct location in the coordinate system 705 of the display of the HMD.

Figure 8:
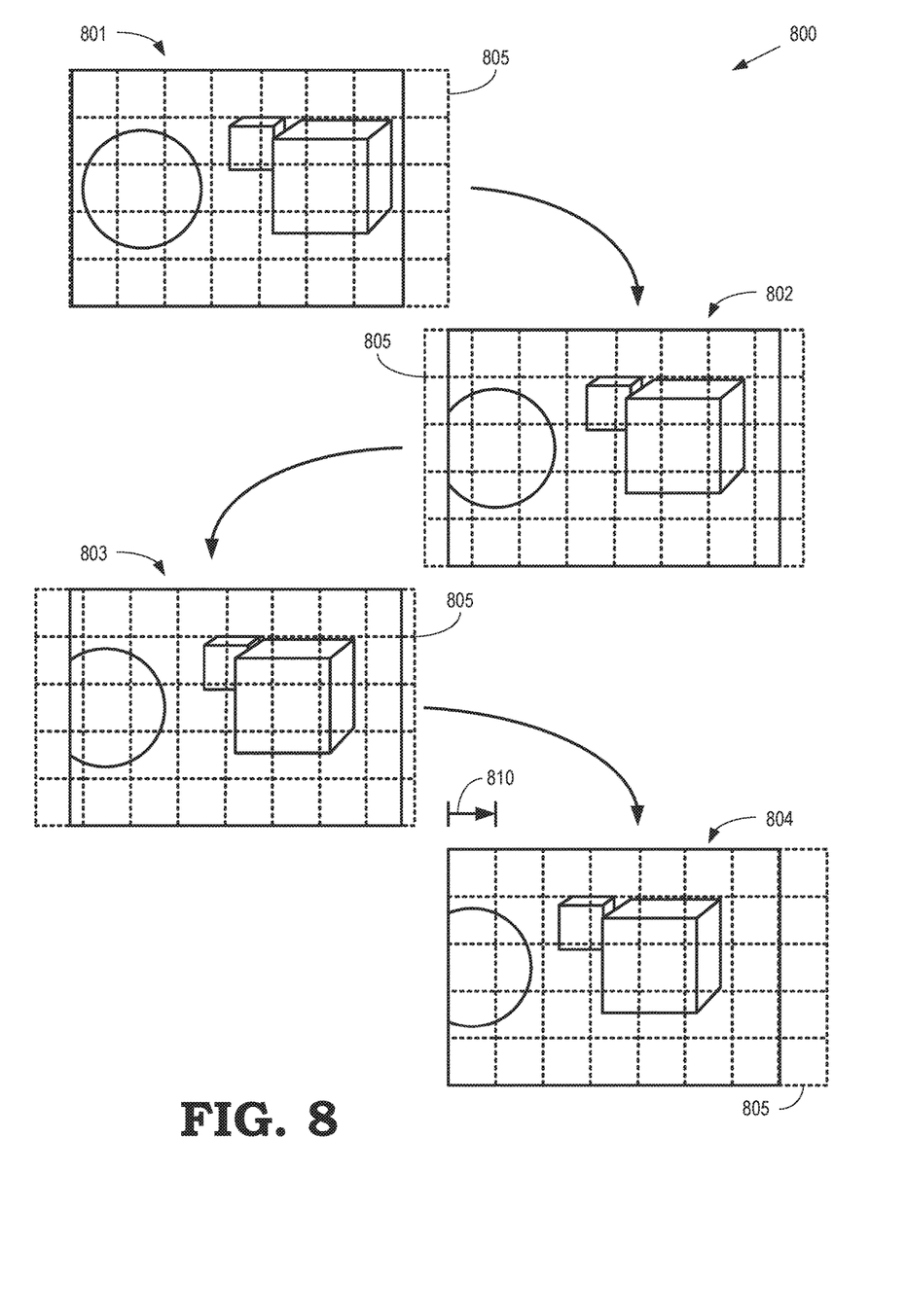
FIG. 8 illustrates a sequence of images of a virtual scene that are generated using an array of rendered pixels having an orientation relative to the virtual scene that is selectively maintained or modified according to some embodiments.

FIG. 8 illustrates a sequence 800 of images of a virtual scene that are generated using an array of rendered pixels having an orientation relative to the virtual scene that is selectively maintained or modified according to some embodiments. The sequence 800 can be acquired or displayed by an electronic device such as the electronic device 105 shown in FIG. 1, the electronic device 205 shown in FIG. 2, the electronic device 305 shown in FIG. 3, and the HMD 405 shown in FIG. 4. The sequence 800 includes images 801, 802, 803, 804 that are collectively referred to herein as "the images 801-804." Each of the images 801-804 is generated at a different orientation of the electronic device relative to the virtual scene. Thus, from the perspective of the user of the electronic device, the objects in the images 801-804 appear to shift to the left in response to motion of the electronic device towards the right.

The image 801 is generated based on an array 805 of rendered pixels that are positioned at an initial or default orientation relative to the display of the electronic device. Thus, a first orientation of the array 805 relative to the virtual scene is the same as a second orientation of the array 805 relative to the display. Values of the display pixels are then generated based on the rendered pixels, as discussed herein. The first and second orientations of the array 805 are the same, and so no translation is necessary between the coordinate systems that are fixed relative to the virtual scene and the display.

The image 802 is generated after the electronic device has moved by an angular distance that is less than an angular resolution of the rendered pixels. The orientation of the array 805 is therefore shifted to maintain the first (fixed) orientation of the array 805 relative to the virtual scene. The first orientation of the array 805 is offset relative to the second orientation that is fixed relative to the display by an amount that is equal to the angular distance. Values of the display pixels are generated based on the rendered pixels and the values of the display pixels are translated from the coordinate system that is fixed relative to the virtual scene to the coordinate system that is fixed relative to the display, as discussed herein.

The image 803 is generated after the electronic device has moved by a larger angular distance, which is still less than the angular resolution of the rendered pixels. The orientation of the array 805 is therefore shifted to maintain the first (fixed) orientation of the array 805 relative to the virtual scene. The first orientation of the array 805 is offset relative to the second orientation that is fixed relative to the display by an amount that is equal to the larger angular distance. Values of the display pixels are generated based on the rendered pixels and the values of the display pixels are translated from the coordinate system that is fixed relative to the virtual scene to the coordinate system that is fixed relative to the display, as discussed herein.

The image 804 is generated after the electronic device has moved by an even larger angular distance that is greater than or equal to the angular resolution of the rendered pixels. The orientation of the array 805 is therefore modified, or snapped, back into alignment with the initial or default orientation. Snapping the orientation of the array 805 into alignment with the initial default orientation includes shifting the array 805 by an amount 810 that is equal to the angular distance between the first orientation of the array 805 and the initial or default orientation of the array 805. The new orientation of the array 805 is therefore the same as the initial or default orientation of the array 805 relative to the display.

Figure 9:
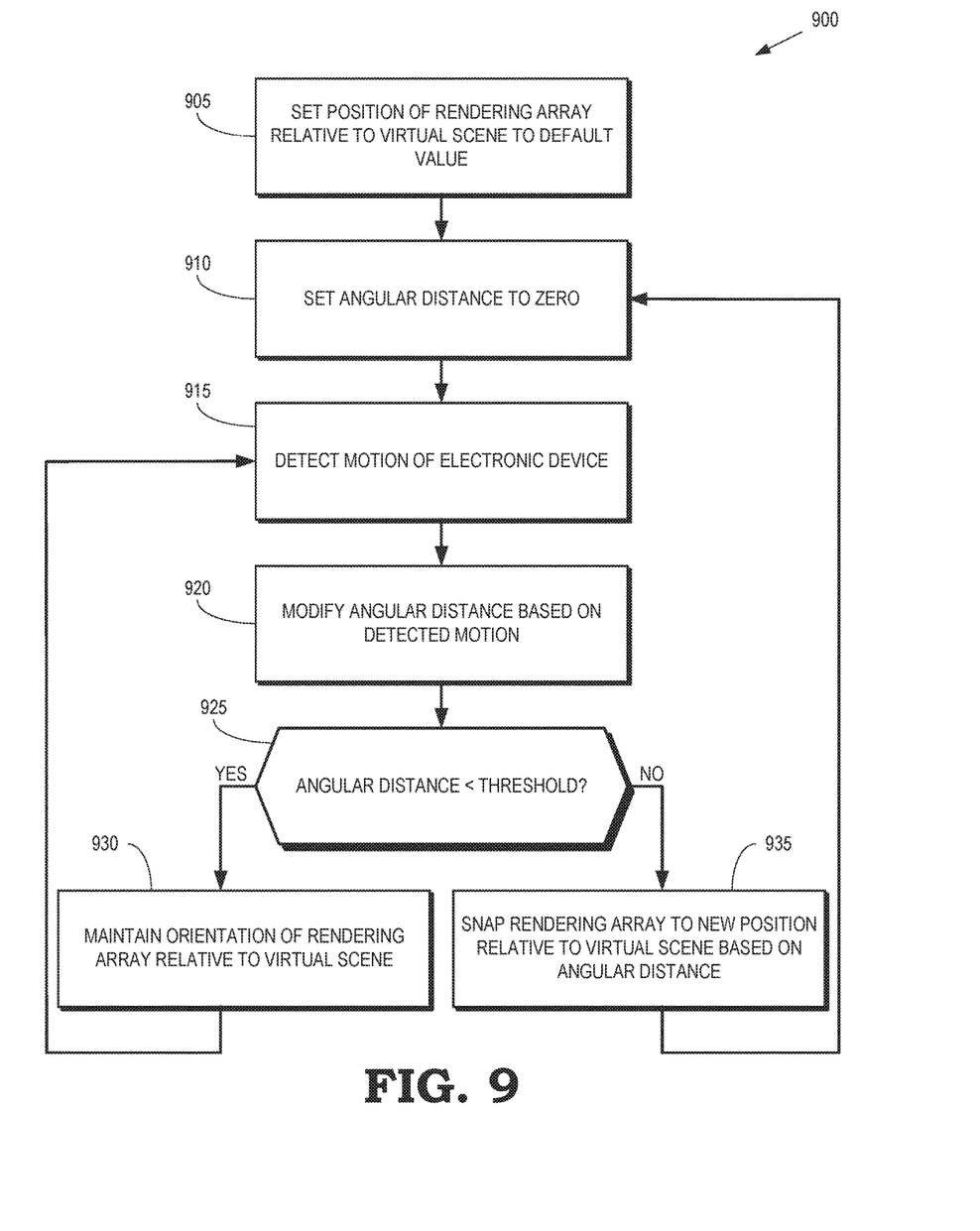
FIG. 9 is a flow diagram of a method for selectively maintaining or modifying an orientation of an array of rendering pixels relative to a virtual scene according to some embodiments.

FIG. 9 is a flow diagram of a method 900 for selectively maintaining or modifying an orientation of an array of rendering pixels relative to a virtual scene according to some embodiments. The method 900 is implemented in some embodiments of an electronic device such as the electronic device 105 shown in FIG. 1, the electronic device 205 shown in FIG. 2, the electronic device 305 shown in FIG. 3, and the HMD 405 shown in FIG. 4.

At block 905, a processing unit implemented in the electronic device sets a position of an array of rendering pixels to a default value relative to the virtual scene. As discussed herein, setting the position of the array of rendering pixels to the default value relative to the virtual scene also corresponds to setting the position of the array of rendering pixels to a default value relative to a display implemented in the electronic device.

At block 910, the processing unit sets a value of an angular distance between an orientation of the array of rendering pixels and the default orientation equal to zero.

At block 915, a motion tracker implemented in the electronic device detects motion of the electronic device, e.g., due to movement of the head of the user wearing the electronic device.

At block 920, the processing unit modifies the angular distance based on the detected motion. For example, the processing unit can modify the angular distance to be equal to an angular distance between the current orientation of the electronic device relative to the virtual scene and the default orientation.

At decision block 925, the processing unit determines whether the angular distance is less than a threshold value that is determined based on an angular resolution of rendered pixels in the array of rendered pixels. The threshold value can be set equal to the angular resolution of a rendered pixel. If the angular distance is less than the threshold, the method 900 flows to block 930. If the angular distance is larger than the threshold, the method flows to block 935.

At block 930, the processing unit maintains the orientation of the rendering array relative to the virtual scene, e.g., by shifting the orientation of the rendering array relative to an orientation of the display of the electronic device. The method 900 then flows to block 915 and the motion tracker continues to monitor motion of the electronic device.

At block 935, the processing unit snaps (or reorients) the rendering array to a new or updated position relative to the virtual scene based on the angular distance. For example, the processing unit can modify the orientation of the rendering array to align with the default orientation. The method 900 then flows to block 910 and the processing unit such as the angular distance back to zero in response to snapping the rendering array back into alignment with the default orientation.

Figure 10:
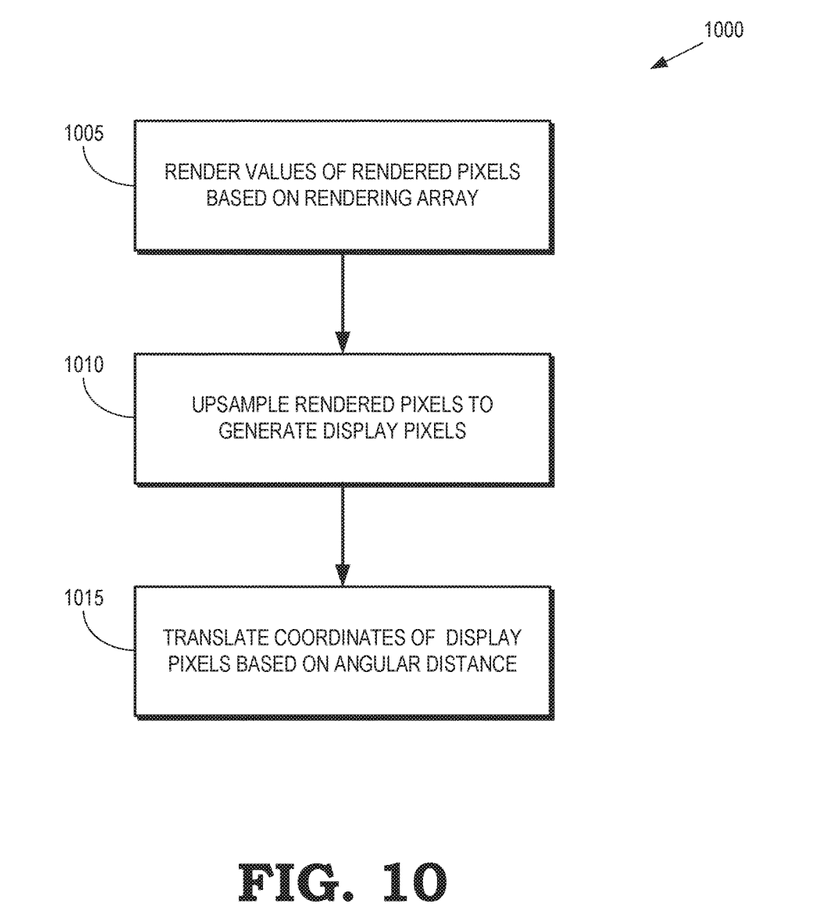
FIG. 10 is a flow diagram of a method for rendering, upsampling, and translating display pixels representative of a virtual scene according to some embodiments.

FIG. 10 is a flow diagram of a method 1000 for rendering, upsampling, and translating display pixels representative of a virtual scene according to some embodiments. The method 1000 is implemented in some embodiments of an electronic device such as the electronic device 105 shown in FIG. 1, the electronic device 205 shown in FIG. 2, the electronic device 305 shown in FIG. 3, and the HMD 405 shown in FIG. 4.

At block 1005, a processing unit in the electronic device renders values of rendered pixels based on a rendering array. The rendered pixels have a resolution that is lower than a native resolution of a display in the electronic device. For example, the rendered pixels can represent portions of the field-of-view that are in relatively low acuity regions such as the low acuity regions 235, 240, 255, 260 shown in FIG. 2. As discussed herein, an orientation of the rendering array can be fixed relative to the virtual scene. The orientation of the rendering array can therefore be offset relative to an orientation that is fixed relative to the display in the processing unit.

At block 1010, the processing unit upsampling the rendered pixels to generate values of display pixels for presentation by the display in the processing unit. For example, the rendered pixels can be upsampled to the native resolution of the display. As discussed herein, the rendered pixels are upsampled in a coordinate system that is fixed relative to the virtual scene. The display pixels should therefore be translated to compensate for any offset between the coordinate system that is fixed relative to the virtual scene and a coordinate system of the display.

At block 1015, the processing unit translates the corners of the display pixels based on an angular distance that represents an offset between the coordinate system that is fixed relative to the virtual scene and the coordinate system of the display. The values of the display pixels can then be presented to the user via the display in the electronic device.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    detecting, using a motion tracker, motion of a display device between first and second orientations, wherein the display device is configured to display a virtual scene;
    selectively maintaining or modifying, at a processor, a position of an array of rendered pixels relative to the virtual scene in response to detecting the motion, wherein selectively maintaining or modifying the position of the array of rendered pixels is based on a comparison of an angular resolution of the rendered pixels and an angular distance between the first and second orientations;
    upsampling, at the processor, the rendered pixels to generate values of display pixels for presentation by the display device; and
    translating, at the processor, the values of the display pixels in a rendering plane of the display device based on the detected motion.

2. The method of claim 1, wherein upsampling the rendered pixels comprises interpolating values of the rendered pixels from a lower resolution to generate the values of the display pixels having a higher resolution that is equal to a native resolution of the display device.

3. The method of claim 1, further comprising:
    setting the position of the array of rendered pixels to correspond to the first orientation that is fixed relative to the virtual scene and the second orientation that is fixed relative to the display device.

4. The method of claim 3, further comprising:
    determining the angular distance between the first orientation and the second orientation based on the detected motion.

5. The method of claim 4, wherein selectively maintaining or modifying the position of the array of rendered pixels relative to the virtual scene comprises maintaining the position of the array at the first orientation relative to the virtual scene in response to determining that the angular distance is less than the angular resolution of the rendered pixels.

6. The method of claim 5, wherein translating the values of the display pixels comprises translating the values of the display pixels by the angular distance in the rendering plane of the display device prior to presentation of the display pixels to a user of the display device.

7. The method of claim 4, wherein selectively maintaining or modifying the position of the array of rendered pixels relative to the virtual scene comprises modifying the position of the array relative to the virtual scene in response to determining that the angular distance is greater than or equal to the angular resolution of the rendered pixels.

8. The method of claim 7, wherein modifying the position of the array of rendered pixels relative to the virtual scene comprises reorienting the position of the array of rendered pixels to the second orientation that is fixed to the display device based on the angular distance in response to the angular distance being greater than or equal to the angular resolution of the rendered pixels.

9. An apparatus, comprising:
a display configured to present a virtual scene represented by display pixels; a motion tracker configured to detect motion of the apparatus between first and second orientations; and
a processor configured to selectively maintain or modify a position of an array of rendered pixels relative to the virtual scene in response to the detected motion, upsample the rendered pixels to generate values of the display pixels for presentation by the display, and translate the values of the display pixels in a rendering plane of the display based on the detected motion, wherein the processor is configured to selectively maintain or modify the position of the array of rendered pixels based on a comparison of an angular resolution of the rendered pixels and an angular distance between the first and second orientations.

10. The apparatus of claim 9, wherein the processor is configured to generate the values of the display pixels by interpolating values of the rendered pixels from a lower resolution to a higher resolution that is equal to a native resolution of the apparatus.

11. The apparatus of claim 9, wherein the processor is configured to set the position of the array of rendered pixels to correspond to the first orientation that is fixed relative to the virtual scene and the second orientation that is fixed relative to the apparatus.

12. The apparatus of claim 11, wherein the processor is configured to determine the angular distance between the first orientation and the second orientation based on the detected motion.

13. The apparatus of claim 12, wherein the processor is configured to maintain the position of the array at the first orientation relative to the virtual scene in response to the angular distance being less than the angular resolution of the rendered pixels.

14. The apparatus of claim 13, wherein the processor is configured to translate the values of the display pixels by the angular distance in the rendering plane of the apparatus prior to presentation of the display pixels.

15. The apparatus of claim 12, wherein the processor is configured to modify the position of the array relative to the virtual scene in response to the angular distance being greater than or equal to the angular resolution of the rendered pixels.

16. The apparatus of claim 15, wherein the processor is configured to reorient the position of the array of rendered pixels to the second orientation that is fixed to the display based on the angular distance in response to the angular distance being greater than or equal to the angular resolution of the rendered pixels.

17. A method for implementation in a head mounted device (HMD) configured to display a representation of a virtual scene, comprising:
maintaining a fixed orientation of an array of rendered pixels relative to the virtual scene concurrent with detecting motion of the HMD;
in response to an angular distance corresponding to the detected motion exceeding a threshold value, reorienting a position of the array of rendered pixels to an updated orientation relative to the virtual scene that corresponds to a second orientation that is fixed relative to the HMD;
upsampling the rendered pixels to generate values of display pixels at a first resolution that is higher than a second resolution of the rendered pixels;
translating the values of the display pixels in a rendering plane of the HMD based on the detected motion; and
displaying the translated values of the display pixels.

18. The method of claim 17, further comprising:
setting a position of the array of rendered pixels to correspond to the fixed orientation relative to the virtual scene, wherein the fixed orientation relative to the virtual scene corresponds to the second orientation that is fixed relative to the HMD.

19. The method of claim 18, further comprising:
determining the angular distance corresponding to the detected motion of the HMD relative to the virtual scene.

20. The method of claim 19, wherein maintaining the fixed orientation of the array of rendered pixels relative to the virtual scene comprises maintaining the fixed orientation of the array of rendered pixels until the angular distance exceeds a threshold value that corresponds to the second resolution of the rendered pixels.

21. The method of claim 19, wherein transmitting the values of the display pixels comprises translating the values of the display pixels based on the angular distance.

* * * * *